United States Patent
Pu et al.

(10) Patent No.: US 11,037,297 B2
(45) Date of Patent: Jun. 15, 2021

(54) IMAGE ANALYSIS METHOD AND DEVICE

(71) Applicant: HANGZHOU HIKVISION DIGITAL TECHNOLOGY CO., LTD., Hangzhou (CN)

(72) Inventors: Shiliang Pu, Hangzhou (CN); Mingyao Zhou, Hangzhou (CN)

(73) Assignee: HANGZHOU HIKVISION DIGITAL TECHNOLOGY CO., LTD., Hangzhou (CN)

(*) Notice: Subject to any disclaimer, the term of this patent is extended or adjusted under 35 U.S.C. 154(b) by 56 days.

(21) Appl. No.: 16/472,680

(22) PCT Filed: Dec. 12, 2017

(86) PCT No.: PCT/CN2017/115621
§ 371 (c)(1),
(2) Date: Jun. 21, 2019

(87) PCT Pub. No.: WO2018/113553
PCT Pub. Date: Jun. 28, 2018

(65) Prior Publication Data
US 2020/0226760 A1  Jul. 16, 2020

(30) Foreign Application Priority Data
Dec. 21, 2016  (CN) .......................... 201611192015.8

(51) Int. Cl.
  *G06T 1/20*  (2006.01)
  *G06F 9/48*  (2006.01)
  (Continued)

(52) U.S. Cl.
  CPC .............. *G06T 7/11* (2017.01); *G06F 9/4856* (2013.01); *G06T 1/20* (2013.01); *G06T 7/00* (2013.01); *G06T 2207/20021* (2013.01)

(58) Field of Classification Search
  CPC ... G06T 7/11; G06T 1/20; G06T 2207/20021; G06T 7/00; G06F 9/4856; G06F 11/3006;
  (Continued)

(56) References Cited

U.S. PATENT DOCUMENTS

| 8,823,969 B1* | 9/2014 | Dubiner | ................ G06T 7/0008 |
| | | | 358/1.15 |
| 2003/0174360 A1* | 9/2003 | Ohshima | ................ G06F 3/1288 |
| | | | 358/1.15 |

(Continued)

FOREIGN PATENT DOCUMENTS

| CN | 105700948 | 6/1916 |
| CN | 106033371 | 10/1916 |

(Continued)

OTHER PUBLICATIONS

Dou et al., "A fast parallel re-computation with redundancy mechanism for parallel digital terrain analysis" *Cluster Comput* 2016, vol. 19, pp. 1769-1785.

(Continued)

*Primary Examiner* — Jon Chang
(74) *Attorney, Agent, or Firm* — Norton Rose Fulbright US LLP (57) ABSTRACT

Disclosed is an image analysis method and apparatus, upon a program crash on a computing node, the central node may acquire the image analysis task that results in the crash, split the image analysis task into multiple image analysis sub-tasks, transmit sequentially the image analysis sub-tasks to the computing node until a program crash occurs thereon. The central node then acquires an error image analysis sub-task that results in the crash on the computing node, and discard the error image analysis sub-task. The image analysis method can discard only the crash resulting image from an image analysis task, while other images in the image analysis task are retained. As such, fewer images are lost, so (Continued)

that the duration of a frame loss during video playback can be reduced and the reliability of image analysis can be improved. The approach is applicable for image analysis.

18 Claims, 9 Drawing Sheets

(51) Int. Cl.
    *G06T 7/00* (2017.01)
    *G06T 7/11* (2017.01)

(58) Field of Classification Search
    CPC ....... H04N 21/44008; H04N 21/23418; H04N 21/443; H04L 29/08135; H04L 29/08144; H04L 67/1002
    See application file for complete search history.

(56) References Cited

U.S. PATENT DOCUMENTS

| | | | |
|---|---|---|---|
| 2004/0255185 A1* | 12/2004 | Fujiyama | G06F 11/1641 714/4.1 |
| 2008/0098370 A1* | 4/2008 | Fontoura | G06F 16/2452 717/139 |
| 2015/0227389 A1 | 8/2015 | Chin et al. | |
| 2018/0052711 A1 | 2/2018 | Zhou et al. | |
| 2018/0198855 A1 | 7/2018 | Wang | |

FOREIGN PATENT DOCUMENTS

| | | |
|---|---|---|
| CN | 106157337 | 11/1916 |
| CN | 1317115 | 10/2001 |
| CN | 100489839 | 5/2009 |
| CN | 101808126 | 8/2010 |
| CN | 103702184 | 4/2014 |
| CN | 104461752 | 3/2015 |
| CN | 104581423 | 4/2015 |
| CN | 104731642 | 6/2015 |
| JP | 2006-148305 | 6/2006 |
| WO | WO 2012/095867 | 7/2012 |

OTHER PUBLICATIONS

Extended European Search Report issued in corresponding European Application No. 17883173.1, dated Oct. 14, 2019.
Notification on Grant of Patent Right for Invention of the priority Chinese application No. 201611192015.8, dated Nov. 11, 2019.
Zhi et al., "A Multi-core Parallel Fusion Algorithm for Remote-Sensing Image" Crown 2010, 4 pages.
International Search Report and Written Opinion issued in Corresponding International Patent Application PCT/CN2017/115621, dated Feb. 24, 2018.

* cited by examiner

IMAGE ANALYSIS METHOD AND DEVICE

CROSS-REFERENCE TO RELATED APPLICATIONS

The present application is a national phase under 35 U.S.C. § 371 of International Application No. PCT/CN2017/115621, filed Dec. 12, 2017, which claims priority to Chinese Patent Application No. 201611192015.8, filed with the China National Intellectual Property Administration on Dec. 21, 2016 and entitled "image analysis method and device", each of which are incorporated into the present application by reference in their entirety.

TECHNICAL FIELD

The present application relates to the field of video analysis, and in particular to an image analysis method and apparatus.

BACKGROUND

Image analysis technology, also known as scene analysis or image understanding, is used for analyzing, describing, classifying and interpreting scenes based on pattern recognition and artificial intelligence.

The massive amount of images in a video can be analyzed by an image analysis system of image analysis technology. The image analysis system typically includes a central node and multiple computing nodes. The images are packed, by the central node, into multiple image analysis tasks, each including multiple associated images (for example, images within in a second in a video being transmitted can be taken as an image analysis task). The computing nodes perform the image analysis tasks respectively acquired from the central node in parallel.

An image task may involve a plurality of images. A computing node may suffer from a program crash (also referred to as process crash) during the process of performing a multi-image task that involves an image of an unsupported format.

The crash-resulting task can be discarded from the computing node and the crashing computing node may be restored to proceed to the next image analysis task. This may, however, result in an entire loss of images in the discarded task. A long-time frame loss may be observed during video playing. The reliability of image analysis is thus reduced.

SUMMARY

In order to solve the problem of a long-time frame loss during video playing in related art due to the discarding of a crash-resulting image analysis task from a computing node, embodiments of the present application provide an image analysis method and apparatus. The following technical solutions are provided.

In an aspect, an image analysis method is provided. The method is applicable to a center node and includes:

upon a program crash on a first computing node, acquiring a first image analysis task that results in the crash on the first computing node;

splitting the first image analysis task into multiple image analysis sub-tasks, each involving one image from the first image analysis task;

transmitting sequentially the multiple image analysis sub-tasks to a second computing node until a program crash occurs on the second computing node;

determining an error image analysis sub-task that results in the program crash on the second computing node; and discarding the error image analysis sub-task.

Optionally, after discarding the error image analysis sub-task, the method further comprises:

combining unanalyzed image analysis sub-tasks from the first image analysis task into a second image analysis task;

transmitting the second image analysis task to a third computing node;

receiving, from the third computing node, a first analysis result for the second image analysis task executed by third computing node; and integrating the first analysis result and a second analysis result into a target analysis result; wherein, the second analysis result is obtained by the second computing node through analyzing the image analysis sub-tasks in the first image analysis task.

Optionally, after splitting the first image analysis task into multiple image analysis sub-tasks, the method further comprises:

assigning an image identity ID to each of the image analysis sub-tasks; wherein, each image ID comprises a source ID for identifying an image analysis task from which the image analysis sub-tasks are split, and each image analysis sub-task carries a respective image ID;

integrating the first analysis result and a second analysis result into a target analysis result comprises:

integrating all the analysis results carrying the source ID into a target analysis result.

Optionally, the central node is provided with a queue of accomplished image tasks to accommodate analysis results for image analysis tasks executed by computing nodes that are managed by the central node, each of the analysis results comprising an analysis result for at least one image, integrating all the analysis results carrying the source ID into a target analysis result comprises:

integrating all the elements for analysis results carrying the source ID in the queue of accomplished image tasks into a single element that contains the target analysis result.

Optionally, the central node is provided with a queue of to-be-filtered image tasks to accommodate image analysis sub-tasks split from an image analysis task that results in a program crash on a computing node, each of the image analysis sub-tasks involving one image;

before transmitting sequentially the multiple image analysis sub-tasks to a second computing node, the method further comprises:

placing sequentially the multiple image analysis sub-tasks into the queue of to-be-filtered image tasks;

transmitting sequentially the multiple image analysis sub-tasks to a second computing node comprises:

acquiring sequentially the multiple image analysis sub-tasks from the queue of to-be-filtered image tasks, and transmitting the multiple image analysis sub-tasks to the second computing node respectively.

Optionally, the central node is provided with a queue of normal image tasks to accommodate image analysis tasks generated by the central node, each of the generated image analysis tasks involving at least one image;

before transmitting the second image analysis task to a third computing node, the method further comprises:

placing the second image analysis task into the queue of normal image tasks;

transmitting the second image analysis task to a third computing node comprises:

acquiring the second image analysis task from the queue of normal image tasks, and transmitting the acquired second image analysis task to the third computing node.

Optionally, each image ID further comprises an image serial number for indicating a rank of an image in the image analysis task indicated by the source ID.

Optionally, the source ID is a timestamp indicating the time of generation of the image analysis task from which the image analysis sub-tasks are split.

In another aspect, an image analysis apparatus is provided. The apparatus is applicable to a center node and includes:

a first acquisition module configured for, upon a program crash on a first computing node, acquiring a first image analysis task that results in the crash on the first computing node;

a splitting module configured for splitting the first image analysis task into multiple image analysis sub-tasks, each involving one image from the first image analysis task;

a first transmitting module configured for transmitting sequentially the multiple image analysis sub-tasks to a second computing node until a program crash occurs on the second computing node;

a second acquisition module configured for determining an error image analysis sub-task that results in the program crash on the second computing node; and a discarding module, configured for discarding the error image analysis sub-task.

Optionally, the apparatus further includes:

a packing module configured for, after discarding the error image analysis sub-task, combining unanalyzed image analysis sub-tasks from the first image analysis task into a second image analysis task;

a second transmitting module configured for transmitting the second image analysis task to a third computing node;

a receiving module configured for receiving, from the third computing node, a first analysis result for the second image analysis task executed by third computing node; and an integration module configured for integrating the first analysis result and a second analysis result into a target analysis result; wherein, the second analysis result is obtained by the second computing node through analyzing the image analysis sub-tasks in the first image analysis task.

Optionally, the apparatus further includes:

an assignment module configured for, after splitting the first image analysis task into multiple image analysis sub-tasks, assigning an image identity ID to each of the image analysis sub-tasks; wherein, each image ID comprises a source ID for identifying an image analysis task from which the image analysis sub-tasks are split, and each image analysis sub-task carries a respective image ID;

the integration module is configured for:

integrating all the analysis results carrying the source ID into a target analysis result.

Optionally, the central node is provided with a queue of accomplished image tasks to accommodate analysis results for image analysis tasks executed by computing nodes that are managed by the central node, each of the analysis results comprising an analysis result for at least one image.

the integration module is configured for:

integrating all the elements for analysis results carrying the source ID in the queue of accomplished image tasks into a single element that contains the target analysis result.

Optionally, the central node is provided with a queue of to-be-filtered image tasks to accommodate image analysis sub-tasks split from an image analysis task that results in a program crash on a computing node, each of the image analysis sub-tasks involving one image; the apparatus further comprises:

a first placing module configured for, before transmitting sequentially the multiple image analysis sub-tasks to a second computing node, placing sequentially the multiple image analysis sub-tasks into the queue of to-be-filtered image tasks;

the first transmitting module is configured for:

acquiring sequentially the multiple image analysis sub-tasks from the queue of to-be-filtered image tasks, and transmitting the multiple image analysis sub-tasks to the second computing node respectively.

Optionally, the central node is provided with a queue of normal image tasks to accommodate image analysis tasks generated by the central node, each of the generated image analysis tasks comprising at least one image, the apparatus further comprises:

a second placing module, configured for, before transmitting the second image analysis task to a third computing node, placing the second image analysis task into the queue of normal image tasks;

the second transmitting module is configured for:

determining the second image analysis task from the queue of normal image tasks, and transmitting the acquired second image analysis task to the third computing node.

Optionally, each image ID further comprises an image serial number for indicating a rank of an image in the image analysis task indicated by the source ID.

Optionally, the source ID is a timestamp indicating the time of generation of the image analysis task from which the image analysis sub-tasks are split.

For the above purpose, an embodiment of the present application further discloses a central node, including: a processor configured for performing any of the image analysis methods described above; and a network interface connected to the processor For the above purpose, an embodiment of the present application further discloses a central node, including: a processor, a network interface, a memory and a bus; wherein, the memory and the network interface are respectively connected to the processor via the bus; the memory stores an operating system and an application program unit capable of performing any of the image analysis methods described above.

For the above purpose, an embodiment of the present application further discloses executable program which, when being executed, performs any of the image analysis methods described above.

For the above purpose, an embodiment of the present application further discloses a storage medium having executable program instructions stored thereon which, when being executed, perform any of the image analysis methods as described above.

Technical solutions provided by the embodiments of the present application have the following beneficial effects.

In the embodiments of image analysis method and apparatus disclosed in the present application, upon a program crash on a computing node, the central node may acquire the image analysis task that results in the crash, split the image analysis task into multiple image analysis sub-tasks, transmit sequentially the image analysis sub-tasks to the computing node until a program crash occurs thereon. The central node then acquires an error image analysis sub-task that results in the crash on the computing node, and discard the error image analysis sub-task. Compared with relevant art, the image analysis method according to the embodiment of the present application discards only the crash resulting image from an image analysis task, while other images in the image analysis task are retained. As such, fewer images are lost, so that the duration of a frame loss during video playback can be reduced and the reliability of image analysis can be improved.

BRIEF DESCRIPTION OF THE DRAWINGS

In order to more clearly describe the technical solutions the embodiments of the present application and the prior art, accompanying drawings that need to be used in embodiments and the prior art will be briefly described below. Obviously, accompanying drawings described below are for only some of embodiments of the present application; those skilled in the art may also obtain other accompanying drawings based on these accompanying drawings without any creative efforts.

FIG. 4-1 is a schematic structural diagram of queues of image tasks on a central node according to an embodiment of the present application.

FIG. 4-2 is another schematic structural diagram of queues of image tasks on a central node according to an embodiment of the present application.

FIG. 4-3 is yet another schematic structural diagram of queues of image tasks on a central node according to an embodiment of the present application.

FIG. 4-4 is still another schematic structural diagram of queues of image tasks on a central node according to an embodiment of the present application.

FIG. 4-5 is another schematic structural diagram of queues of image tasks on a central node according to an embodiment of the present application.

FIG. 6-1 is another schematic structural diagram of an image analysis apparatus according to an embodiment of the present application.

FIG. 6-2 is yet another schematic structural diagram of an image analysis apparatus according to an embodiment of the present application.

FIG. 6-3 is still another schematic structural diagram of an image analysis apparatus according to an embodiment of the present application.

FIG. 6-4 is another schematic structural diagram of an image analysis apparatus according to an embodiment of the present application.

DETAILED DESCRIPTION

In order to make the objectives, technical solutions, and advantages of the present application more comprehensive, the present application will be described in more detail below with reference to the drawings and embodiments. Obviously, the described embodiments are only some of, but not all the embodiments of the present application. All other embodiments obtained based on the embodiments of the present application by those skilled in the art without any creative efforts fall into the scope the present application.

In order to make the objects, technical solutions and advantages of the present application more clear, embodiments of the present application will be further described in detail below with reference to drawings.

Figure 1:
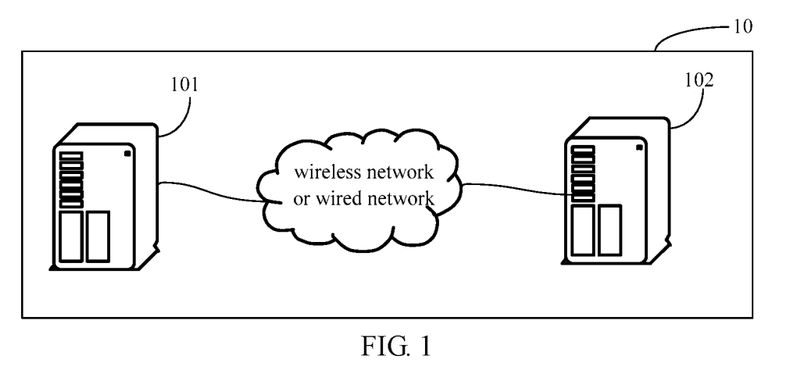
FIG. 1 is a schematic structural diagram of an image analysis system on which the image analysis methods according to embodiments of the present application can be implemented.

FIG. 1 is a schematic structural diagram of an image analysis system 10 on which an image analysis method according to an embodiment of the present application can be implemented. As shown in FIG. 1, the image analysis system 10 may include a central node 101 and at least one computing node 102.

The central node 101 may be a server, a server cluster composed of several servers, or a cloud computing service center. For example, the central node may be a video server or the like. Likewise, the computing node 102 may be a server, a server cluster composed of several servers, or a cloud computing service center.

A connection may be established between the central node 101 and the computing node 102 via a wired network or a wireless network.

The central node may be provided with three image task queues, including a queue of normal image tasks, a queue of to-be-filtered image tasks and a queue of accomplished image tasks. The queue of normal image tasks accommodates image analysis tasks generated by the central node; each task involving at least one image. The queue of to-be-filtered image tasks accommodates image analysis sub-tasks split from an image analysis task that results in a program crash on a computing node. Each of the image analysis sub-tasks involves one image. The queue of accomplished tasks accommodates analysis results for image analysis tasks executed by calculation nodes managed by the central node. Each of the analysis results includes an analysis result for at least one image. The central node may pack images in an acquired video into image analysis tasks, and place the image analysis tasks into the queue of normal image tasks. The central node may acquire and transmit the image analysis tasks in the queue of normal image tasks to the computing nodes, so that the image analysis tasks can be executed by the computing nodes.

Figure 2:
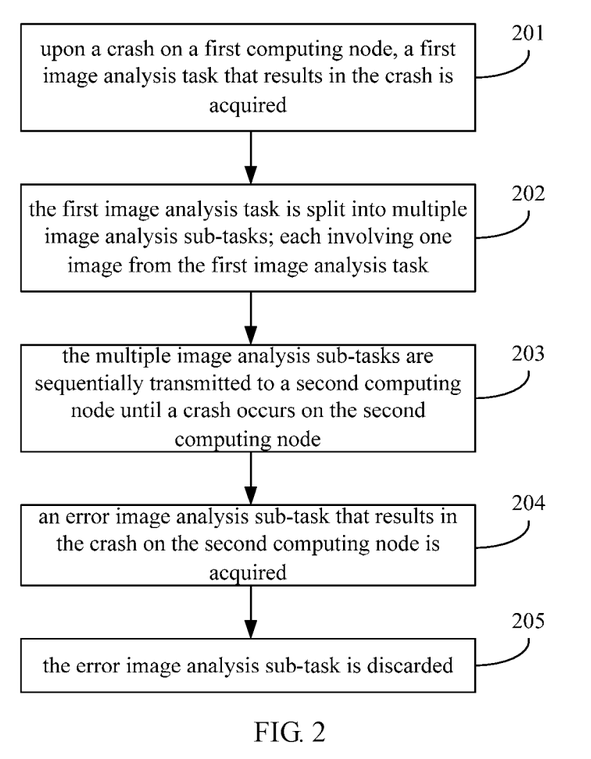
FIG. 2 is a flow chart of an image analysis method according to an embodiment of the present application.

FIG. 2 is a flowchart of an image analysis method according to an embodiment of the present application that may be implemented on the central node 101 in the image analysis system 10 shown in FIG. 1. As shown in FIG. 2, the method may include the following operations.

At 201, upon a crash on a first computing node, a first image analysis task that results in the crash is acquired.

At 202, the first image analysis task is split into multiple image analysis sub-tasks; each involving one image from the first image analysis task.

At 203, the multiple image analysis sub-tasks are sequentially transmitted to a second computing node until a crash occurs on the second computing node.

At 204, an error image analysis sub-task that results in the crash on the second computing node is acquired.

At 205, the error image analysis sub-task is discarded.

In the image analysis method provided by the embodiment of the present application, upon a program crash on a computing node, the central node may acquire the crash-resulting image analysis task, split the image analysis task into multiple image analysis sub-tasks to be transmitted sequentially to another computing node until a program crash occurs thereon, and then acquire and discard the error image analysis sub-task that results in the crash. Compared with relevant art, the image analysis method according to the embodiment of the present application discards only the crash resulting image from an image analysis task, while other images in the image analysis task are retained. As such, fewer images are lost, so that the duration of a frame loss during video playback can be reduced and the reliability of image analysis can be improved.

Figure 3:
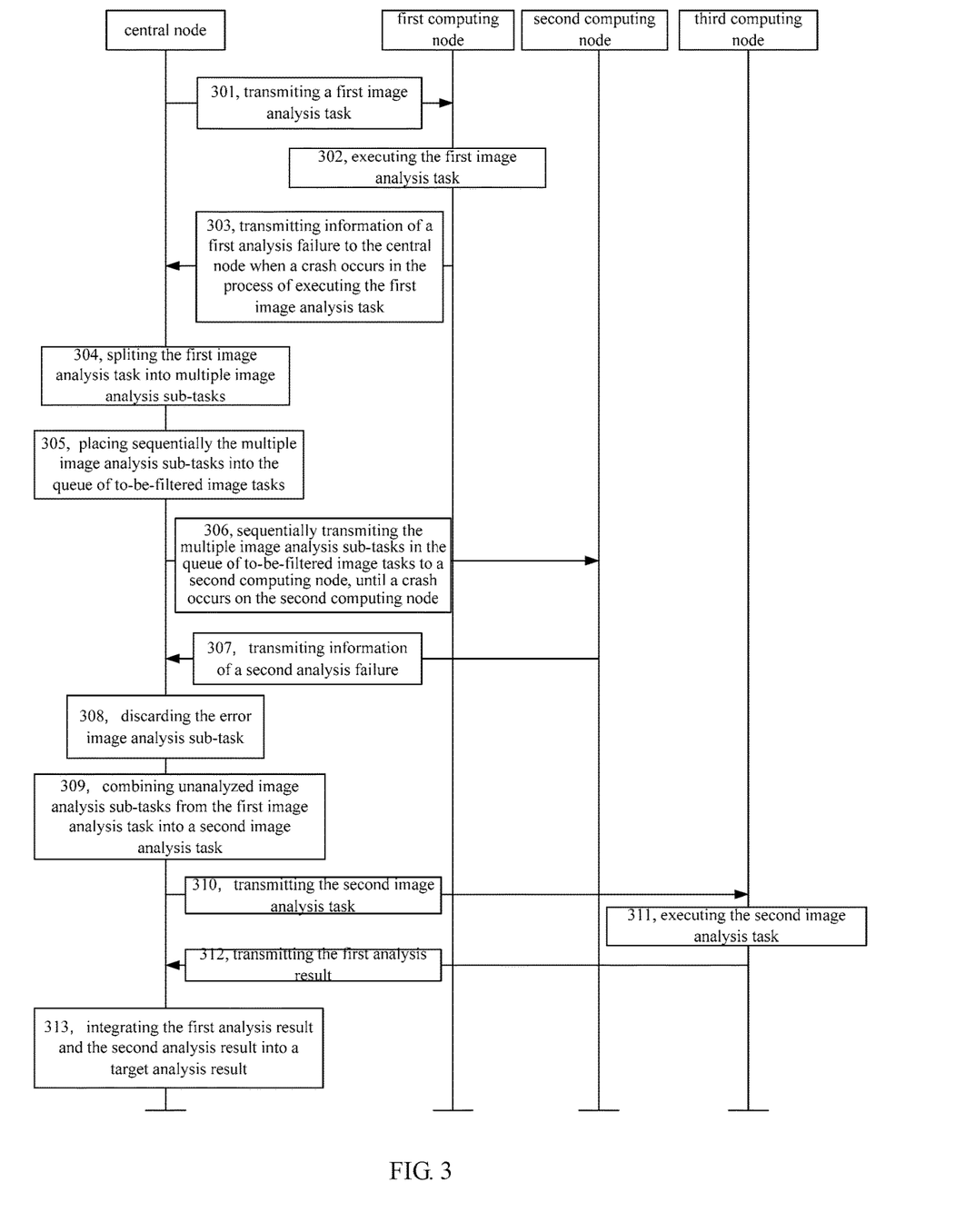
FIG. 3 is another flow chart of an image analysis method according to an embodiment of the present application.

In practice, a central node may manage multiple computing nodes. The embodiment of the present application is described with reference to an example where the central node manages 3 computing nodes. The 3 computing nodes include a first computing node, a second computing node and a third computing node, as shown in FIG. 3 that illustrates a flowchart of another image analysis method according to an embodiment of the present application applicable to the image analysis system 10 shown in FIG. 1. The method may include the following operations.

At 301, the central node transmits a first image analysis task to the first computing node.

The first computing node, after being powered on, may send to the central node a request for an image analysis task. The central node may assign an image analysis task to the first computing node if it is determined to be adequate for the task. It is assumed that a first image analysis task is assigned to the first computing node, the central node then transmits the first image analysis task to the first computing node. The first computing node is determined to be adequate for the first image analysis task if an image analysis task can be performed thereon.

Optionally, after acquiring a video stream, the central node may pack all the images of a large amount in the video stream into image analysis tasks, each involving at least one image. In a practical application, in order to speed up processing, an image analysis task typically involves a plurality of associated images, for example, images of the video transmitted in one second. The packed image analysis tasks are accommodated in a queue of normal image tasks on the central node. The central node transmits a first image analysis task in the queue to the first computing node.

Optionally, the first image analysis task may be retained in the queue of normal image tasks on the central node after being transmitted to the first computing node and is not to be deleted until the central node is informed that the task is accomplished by the first computing node. Alternatively, the first image analysis task may be deleted from the central node immediately after being transmitted to the first computing node without a feedback received therefrom.

At 302, the first computing node executes the first image analysis task.

The first computing node executes the first image analysis task as received from the central node by analyzing each image in the first image analysis task.

At 303, the first computing node transmits information of a first analysis failure to the central node when a crash occurs in the process of executing the first image analysis task.

The first computing node may encounter a crash during the performance of the first image analysis task if an irreversible case occurs (for example, there is an image of an unsupported format in the first image analysis task). Upon such a crash, the first computing node provides a feedback on a first failure of the analysis task to the central node and informs the central node about the crash. In a case that the first image analysis task is deleted from the queue of normal image tasks on the central node after being transmitted to the first computing node, the first analysis failure as fed back by the first computing node has to carry the first image analysis task for subsequent operations by the central node. In a case that the first image analysis task is retained in the queue of normal image tasks on the central node after being transmitted to the first computing node, the first analysis failure transmitted by the first computing node can merely contains an error prompt without the first image analysis task.

Optionally, the central node may monitor a program crash occurring on the first computing node. Specifically, the central node may determine that a crash occurs on the first computing node if no analysis result for the first image analysis task is received from the first computing node within a preset time period after the task is transmitted thereto. If the first image analysis task is still retained in the queue of normal image tasks, the central node may directly perform subsequent operations on the first image analysis task retained in the queue, or otherwise, the central node may acquires the first image analysis task from the first computing node for subsequent operations.

At 304, the central node splits the first image analysis task into multiple image analysis sub-tasks.

Optionally, the central node may acquire the first image analysis task after receiving the first analysis failure as fed back by the first computing node, and split the first image analysis task into multiple image analysis sub-tasks, each involving an image from the first image analysis task.

Specifically, after splitting the first image analysis task into multiple image analysis sub-tasks, the central node assigns an image identity (ID) to each image analysis sub-task. Each image ID includes a source ID for identifying an image analysis task from which the image analysis sub-task are split. For example, all the image analysis sub-tasks split from a first image analysis task will carry an image ID having a source ID that identifies the first image analysis task.

Optionally, an image ID may further include an image serial number that indicates a rank of the image in an image analysis task identified by a source ID. For example, in the multiple image analysis sub-tasks split from the first image analysis task, the image serial number included in the image ID of each image analysis sub-task indicates the rank of the corresponding image in the first image analysis task. The source ID identifies the image analysis task from which an image analysis sub-task is split. For example, the source ID of all the image analysis sub-tasks split from a first image analysis task may be a timestamp indicating the time of the generation of the first image analysis task. For another example, the source ID in each of the multiple image analysis sub-tasks split from the first image analysis task may also be a serial number of the first image analysis task.

For example, it is assumed that the first image analysis task includes 5 images. The central node splits the 5 images into 5 image analysis sub-tasks, having respectively image IDs as follows: 201610251855-1, 201610251855-2, 201610251855-3, 201610251855-4 and 201610251855-5; wherein, 201610251855 is a source ID. Optionally, the source ID may be either a timestamp for the generation of the first image analysis task, or a timestamp for the transmission of the first image analysis task from the central node to the first computing node.

For example, it is assumed that the first image analysis task includes 3 images and has a numeral of A108. Image IDs carried by all the image analysis sub-tasks may be: A1081, A1082 and A1083; wherein, A108 is the source ID.

At 305, the central node places sequentially the multiple image analysis sub-tasks into the queue of to-be-filtered image tasks.

Optionally, the central node is provided with a queue of to-be-filtered image tasks to accommodate image analysis sub-tasks split from an image analysis task that results in a program crash on a computing node; wherein, each of the image analysis sub-tasks involves one image.

At 306, the central node sequentially transmits the multiple image analysis sub-tasks in the queue of to-be-filtered image tasks to a second computing node, until a crash occurs on the second computing node.

Optionally, the second computing node may be one or more computing nodes in the image analysis system. For example, the central node may assign all the image analysis sub-tasks to a single computing node to be executed, or otherwise, the central node may assign the image analysis sub-tasks to a plurality of computing nodes for parallel execution. The second computing node refer to all the computing nodes that execute the image analysis sub-tasks. Optionally, the second computing node may include a restored first computing node.

Specifically, to transmit sequentially the multiple image analysis sub-tasks to the second computing node, the central node may acquire sequentially the multiple image analysis sub-tasks from a queue of to-be-filtered image tasks, and transmitting the multiple image analysis sub-tasks to the second computing node respectively.

Optionally, after being transmitted, an image analysis sub-ask may be retained in the queue of to-be-filtered image tasks on the central node until an analysis result for the sub-task is received from a second computing node. Alternatively, an image analysis sub-task may be directly deleted from the central after being transmitted to a second computing node without a feedback received therefrom.

At 307, the second computing node transmits information of a second analysis failure to the central node.

Optionally, the second analysis failure information may include an error image analysis sub-task that results in a crash on the second computing node. The detail of the step is omitted and reference can be made to operation 303 as described above.

Optionally, the second computing node transmits, before the crash, at least one analysis result for at least one image analysis sub-task from the first image analysis task to the central node to be accommodated in the queue of accomplished image tasks. The at least one analysis result does not include the analysis result for the error image analysis sub-task.

At 308, the central node discards the error image analysis sub-task.

In the embodiment of the present application, the central node discards the image that results in a crash on the computing node, and retains other images in the image analysis task. This effectively reduces the number of discarded images, and thus reduces the amount of data lost in the image analysis process as much as possible and increases the reliability of image analysis.

At 309, the central node combines unanalyzed image analysis sub-tasks from the first image analysis task into a second image analysis task.

Optionally, after the combination of the unanalyzed image analysis sub-tasks from the first image analysis task into the second image analysis task, the central node places the second image analysis task into the normal image task queue.

At 310, the central node transmits the second image analysis task to a third computing node.

Specifically, the central node acquires the second image analysis task from a queue of normal image tasks, and transmits the acquired second image analysis task to the third computing node. For details, reference can be made to the operation 301 described above.

Optionally, the third computing node may be any computing node in the image analysis system.

At 311, the third computing node executes the second image analysis task.

Specifically, the third computing node executes the second image analysis task and obtains a first analysis result.

At 312, the third computing node transmits the first analysis result to the central node.

The central node places the received first analysis result in the queue of accomplished image tasks.

At 313, the central node integrates the first analysis result and a second analysis result into a target analysis result. The first image analysis task is hereby accomplished.

The second analysis result includes at least one analysis result for at least one image analysis sub-task in the first image analysis task executed by the second computing node.

Optionally, the integration of the first analysis result and the second analysis result into a target analysis result may be implemented by integrating all the analysis results carrying the same source ID into a target analysis result. For example, the target analysis result may include all the images in a first image analysis task involving images for a video transmitted in a second except for the error image analysis sub-task. Through the integration of images in the first image analysis task, the smoothness for video playback can be improved as the disorder of images can be avoided.

Specifically, the central node integrates all the elements for analysis results carrying the source ID in the queue of accomplished image tasks into a single element that contains the target analysis result. Optionally, the integrated target analysis result may be placed in a position that the first analysis result carrying the source ID has in the queue of accomplished image tasks. The positions of the other image analysis tasks in the queue are adjusted based on a preset queue arrangement rule to avoid empty elements in the queue.

The image analysis method provided by the embodiment of the present application is applicable to a central processing unit (CPU) such as an X86 machine, or a graphic processor unit (GPU) such as a heterogeneous machine. The image analysis method may be widely used on different hardware platforms.

The process in which nodes in an image analysis system execute image analysis tasks is described with reference to the following embodiment.

The central node 101 may be provided with a queue 101a of normal image tasks, a queue 101b of to-be-filtered image tasks and a queue 101c of accomplished image tasks.

Figure 41:
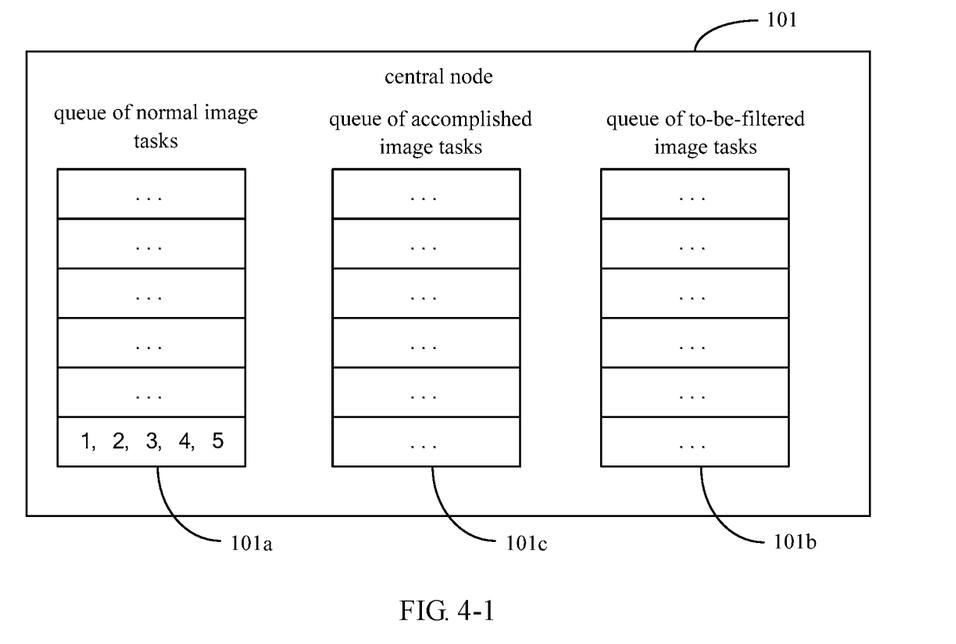

These queues of the central node are shown in FIG. 4-1. A first image analysis task is accommodated, as an element, in the queue 101a of normal image tasks. It is assumed that the first image analysis task involves 5 images, having respectively serial numbers of 1, 2, 3, 4, and 5 in order.

Figure 42:
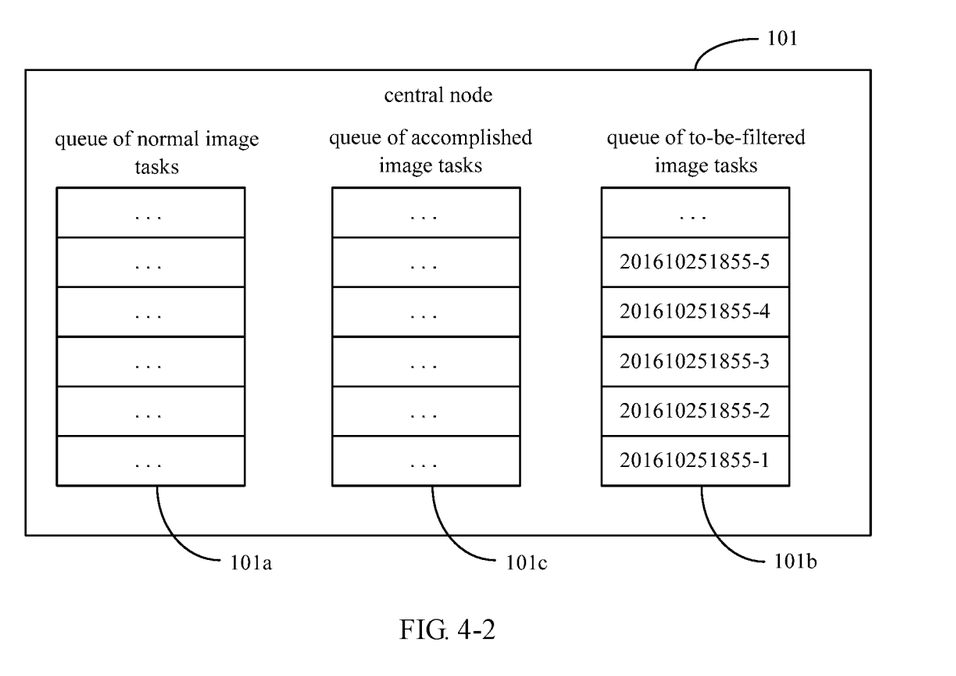

When the first computing node encounters a program crash, the queues of the central node are shown in FIG. 4-2. The central node 101 acquires the first image analysis task, splits the first image analysis task involving 5 images into 5 image analysis sub-tasks involving a single image, having respectively image IDs of 201610251855-1, 201610251855-2, 201610251855-3, 201610251855-4, and 201610251855-5. The central node 101 then places the 5 image analysis sub-tasks in the queue of to-be-filtered image tasks 101b.

Figure 43:
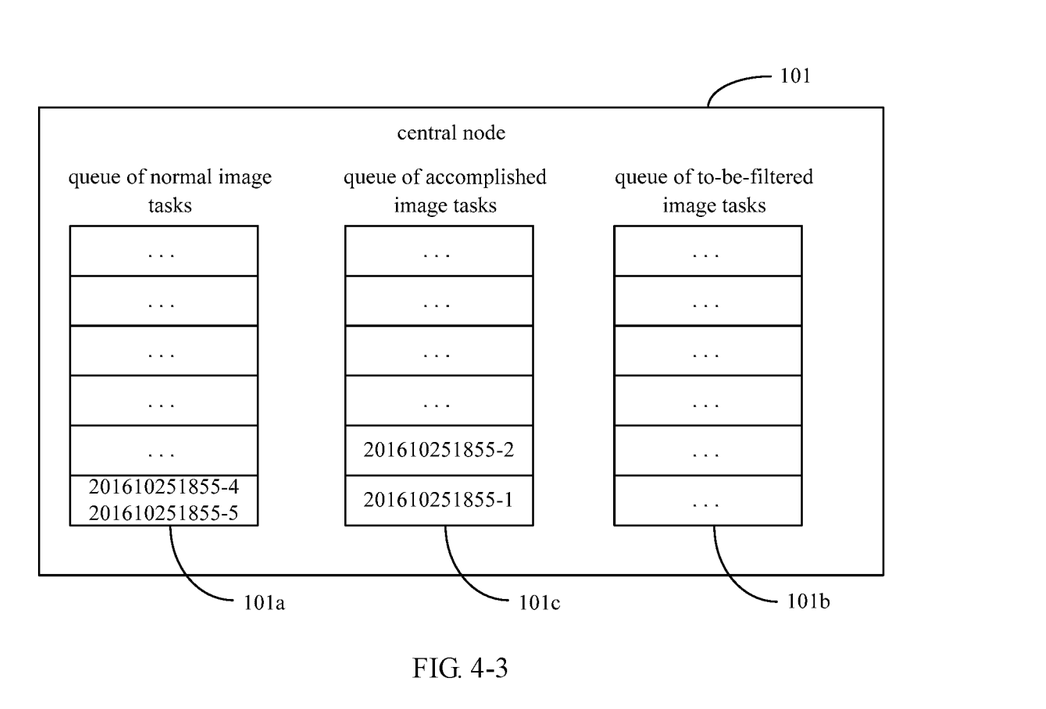

It is assumed that the third image analysis sub-task results in a crash on the second computing node. The image task queues of the central node are shown in FIG. 4-3. A second analysis result for the first image analysis sub-task and the second image analysis sub-task executed by the second computing node are placed in the queue 101c of accomplished image tasks; wherein, 201610251855-1 is the image ID of the analysis result (which is a queue element) for the first image analysis sub-task, and 201610251855-2 is the image ID of an analysis result (an element) for the second image analysis sub-task. Further, after discarding the third image analysis sub-task, the central node combines the fourth image analysis sub-task and the fifth image analysis sub-task into a second image analysis task, and places the second image analysis task in the queue 101a of normal image analysis tasks.

Figure 44:
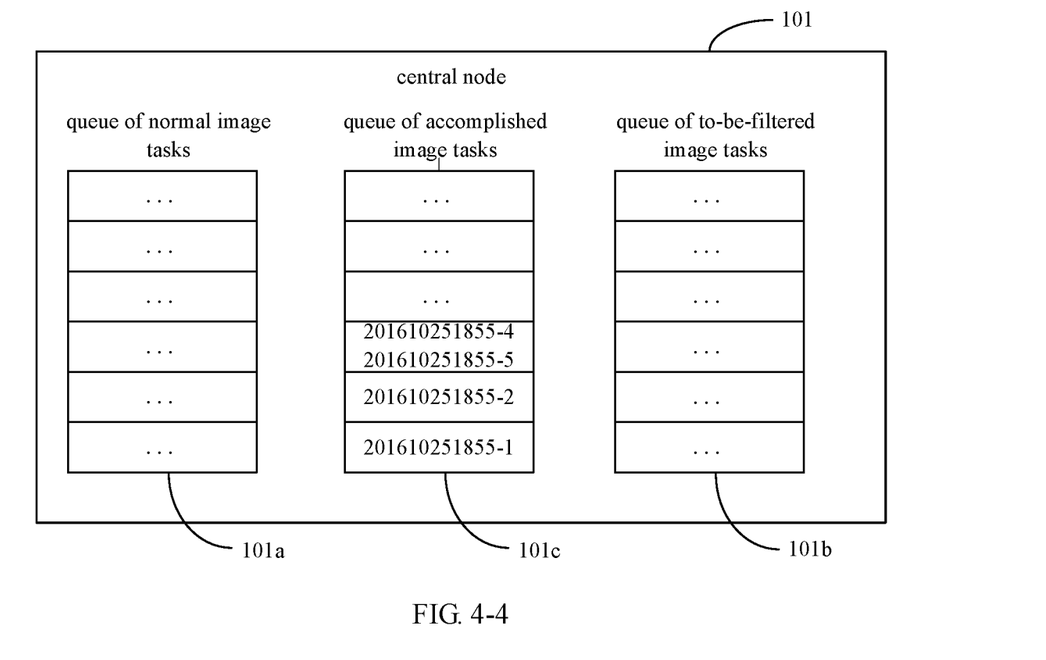

Further, as shown in FIG. 4-4, the central node places the first analysis result for the second image analysis task executed by the third computing node into the queue 101c of accomplished image tasks. The first analysis result includes the analysis result for the fourth image analysis sub-task with the image ID of 201610251855-4 and the analysis result for the fifth image analysis sub-task with the image ID of 201610251855-5.

Figure 45:
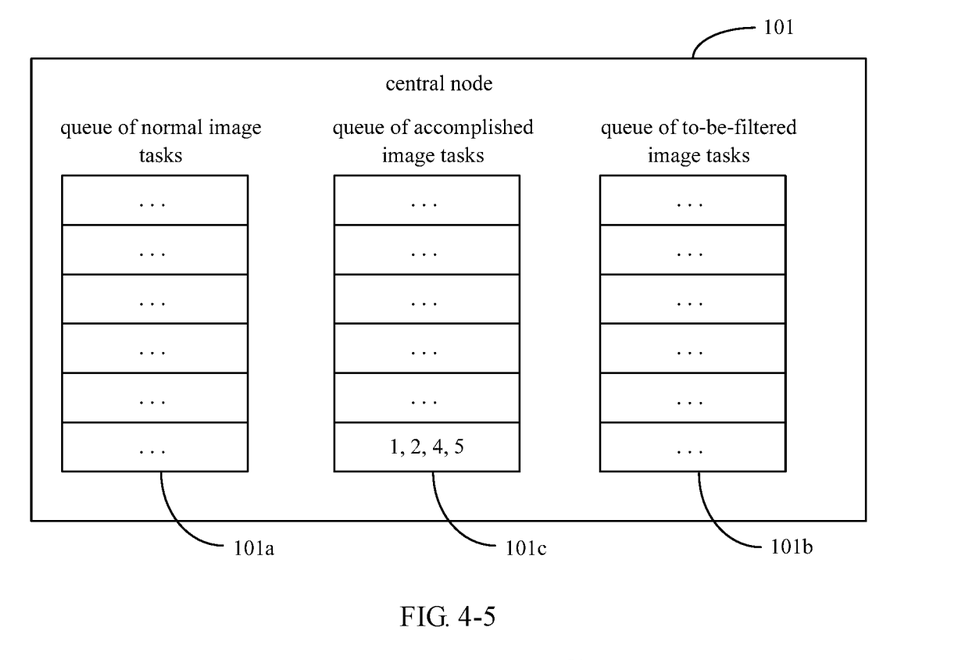

The central node then integrates the first analysis result and the second analysis result in the queue 101c of accomplished image tasks into the target analysis result. As shown in FIG. 4-5, the target analysis result includes 4 images having serial numbers of 1, 2, 4 and 5. The target analysis result may be placed, as one element, in the position of the first image analysis sub-task with the image ID of 201610251855-1.

In summary, in the image analysis method according to the embodiment of the present application, upon a program crash on a computing node, the central node may acquire the image analysis task that results in the crash, split the image analysis task into multiple image analysis sub-tasks, transmit sequentially the image analysis sub-tasks to the computing node until a program crash occurs thereon. The central node then acquires an error image analysis sub-task that results in the crash on the computing node, and discard the error image analysis sub-task. Compared with relevant art, the image analysis method according to the embodiment of the present application discards only the crash resulting image from an image analysis task, while other images in the image analysis task are retained. As such, fewer images are lost, so that the duration of a frame loss during video playback can be reduced and the reliability of image analysis can be improved.

Figure 5:
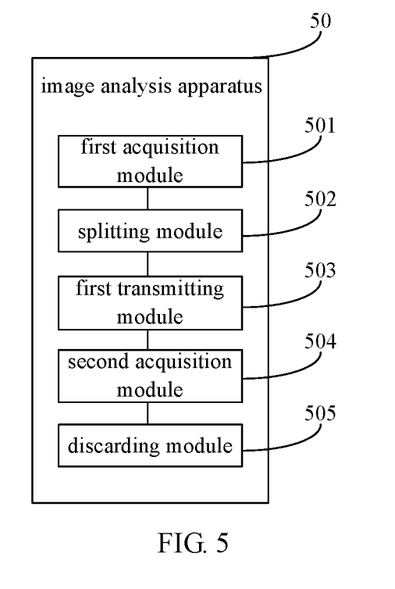
FIG. 5 is a schematic structural diagram of an image analysis apparatus according to an embodiment of the present application.

FIG. 5 is a schematic structure diagram of an image analysis apparatus 50 provided by an embodiment of the present application. The apparatus is applicable to the central node 101 in the image analysis system 10 as shown in FIG. 1. As shown in FIG. 5, the apparatus may include a first acquisition module 501, a splitting module 502, a first transmitting module 503, a second acquisition module 504, and a discarding module 505.

The first acquisition module 501 is configured for acquiring a first image analysis task that results in the crash on the first computing node upon a program crash on a first computing node;

The splitting module 502 is configured for splitting the first image analysis task into multiple image analysis sub-tasks, each involving one image from the first image analysis task.

The first transmitting module 503 is configured for transmitting sequentially the multiple image analysis sub-tasks to a second computing node until a program crash occurs on the second computing node.

The second acquisition module 504 is configured for determining an error image analysis sub-task that results in the program crash on the second computing node.

The discarding module 505 is configured for discarding the error image analysis sub-task.

In the embodiment of the image analysis apparatus described above, upon a program crash on a computing node, the central node may acquire the image analysis task that results in the crash, split the image analysis task into multiple image analysis sub-tasks, transmit sequentially the image analysis sub-tasks to the computing node until a program crash occurs thereon. The central node then acquires an error image analysis sub-task that results in the crash on the computing node, and discard the error image analysis sub-task. Compared with relevant art, the image analysis method according to the embodiment of the present application discards only the crash resulting image from an image analysis task, while other images in the image analysis task are retained. As such, fewer images are lost, so that the duration of a frame loss during video playback can be reduced and the reliability of image analysis can be improved.

Figure 61:
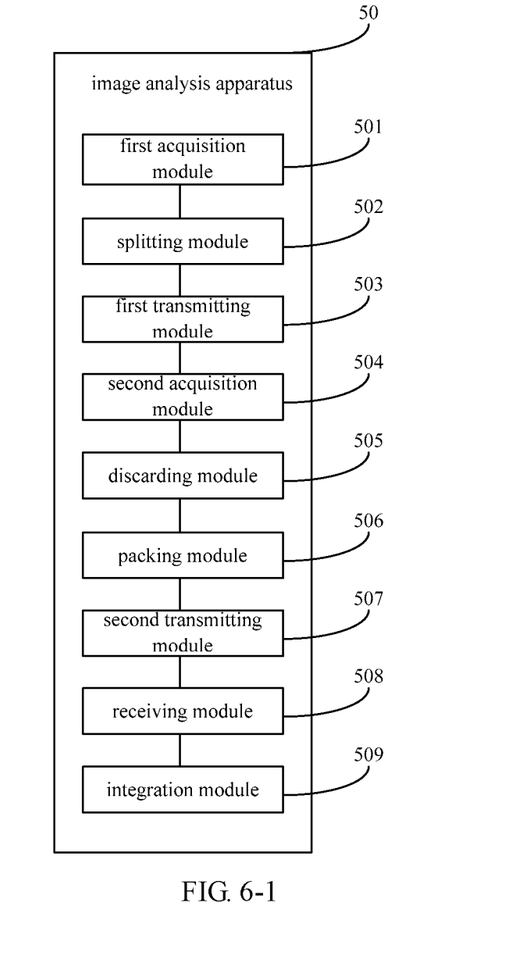

Optionally, as shown in FIG. 6-1, the apparatus 50 may further include a packing module 506, a second transmitting module 507, a receiving module 508, and an integration module 509.

The packing module 506 is configured for, after discarding the error image analysis sub-task, combining unanalyzed image analysis sub-tasks from the first image analysis task into a second image analysis task.

The second transmitting module 507 is configured for transmitting the second image analysis task to a third computing node.

The receiving module 508 is configured for receiving, from the third computing node, a first analysis result for the second image analysis task executed by third computing node.

The integration module 509 is configured for integrating the first analysis result and a second analysis result into a target analysis result; wherein, the second analysis result is obtained by the second computing node through analyzing the image analysis sub-tasks in the first image analysis task.

Figure 62:
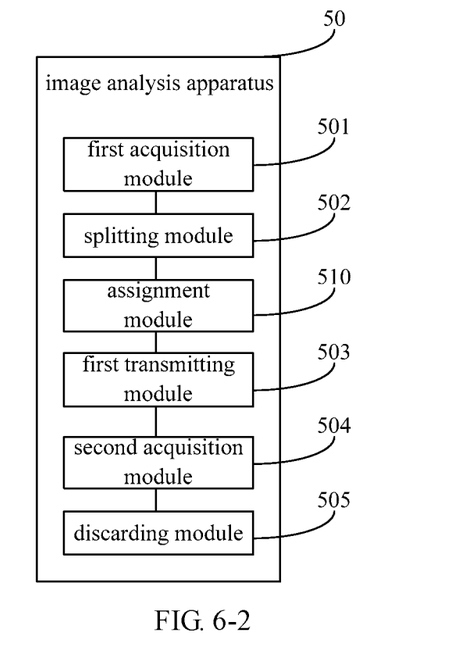

Optionally, as shown in FIG. 6-2, the apparatus 50 may further include an assignment module 510 configured for, after splitting the first image analysis task into multiple image analysis sub-tasks, assigning an image identity ID to each of the image analysis sub-tasks; wherein, each image ID comprises a source ID for identifying an image analysis task from which the image analysis sub-tasks are split, and each image analysis sub-task carries a respective image ID.

Optionally, the integration module 509 may be configured for integrating all the analysis results carrying the source ID into a target analysis result.

Optionally, the central node may be provided with a queue of accomplished image tasks to accommodate analysis results for image analysis tasks executed by computing nodes that are managed by the central node, each of the analysis results comprising an analysis result for at least one image. The integration module 509 may be configured for integrating all the elements for analysis results carrying the source ID in the queue of accomplished image tasks into a single element that contains the target analysis result.

Figure 63:
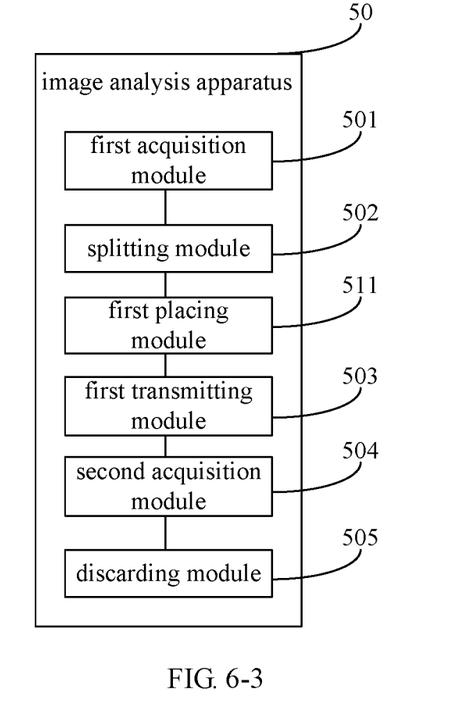

Optionally, the central node may be provided with a queue of to-be-filtered image tasks to accommodate image analysis sub-tasks split from an image analysis task that results in a program crash on a computing node, each of the image analysis sub-tasks involving one image. As shown in FIG.

6-3, the apparatus 50 may further include a first writing module 511 configured for, before transmitting sequentially the multiple image analysis sub-tasks to a second computing node, placing sequentially the multiple image analysis sub-tasks into the queue of to-be-filtered image tasks.

Optionally, the first transmitting module 503 may be configured for: acquiring sequentially the multiple image analysis sub-tasks from the queue of to-be-filtered image tasks, and transmitting the multiple image analysis sub-tasks to the second computing node respectively.

Figure 64:
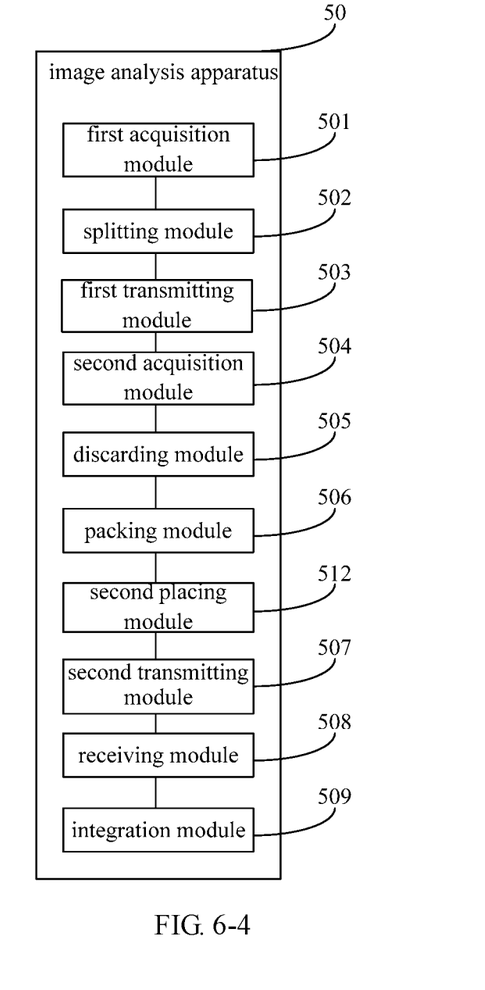

The central node may be provided with a queue of normal image tasks to accommodate image analysis tasks generated by the central node, each of the generated image analysis tasks comprising at least one image. Optionally, as shown in FIG. 6-4, the apparatus 50 may further include a second writing module 512 configured for, before transmitting the second image analysis task to a third computing node, placing the second image analysis task into the queue of normal image tasks.

Optionally, the second transmitting module 507 may be configured for determining the second image analysis task from the queue of normal image tasks, and transmitting the acquired second image analysis task to the third computing node.

Optionally, each image ID further comprises an image serial number for indicating a rank of an image in the image analysis task indicated by the source ID.

Optionally, the source ID is a timestamp indicating the time of generation of the image analysis task from which the image analysis sub-tasks are split.

In summary, in the image analysis apparatus provided by the embodiment of the present application, upon a program crash on a computing node, the central node may acquire the image analysis task that results in the crash, split the image analysis task into multiple image analysis sub-tasks, transmit sequentially the image analysis sub-tasks to the computing node until a program crash occurs thereon. The central node then acquires an error image analysis sub-task that results in the crash on the computing node, and discard the error image analysis sub-task. Compared with relevant art, the image analysis method according to the embodiment of the present application discards only the crash resulting image from an image analysis task, while other images in the image analysis task are retained. As such, fewer images are lost, so that the duration of a frame loss during video playback can be reduced and the reliability of image analysis can be improved.

Figure 7:
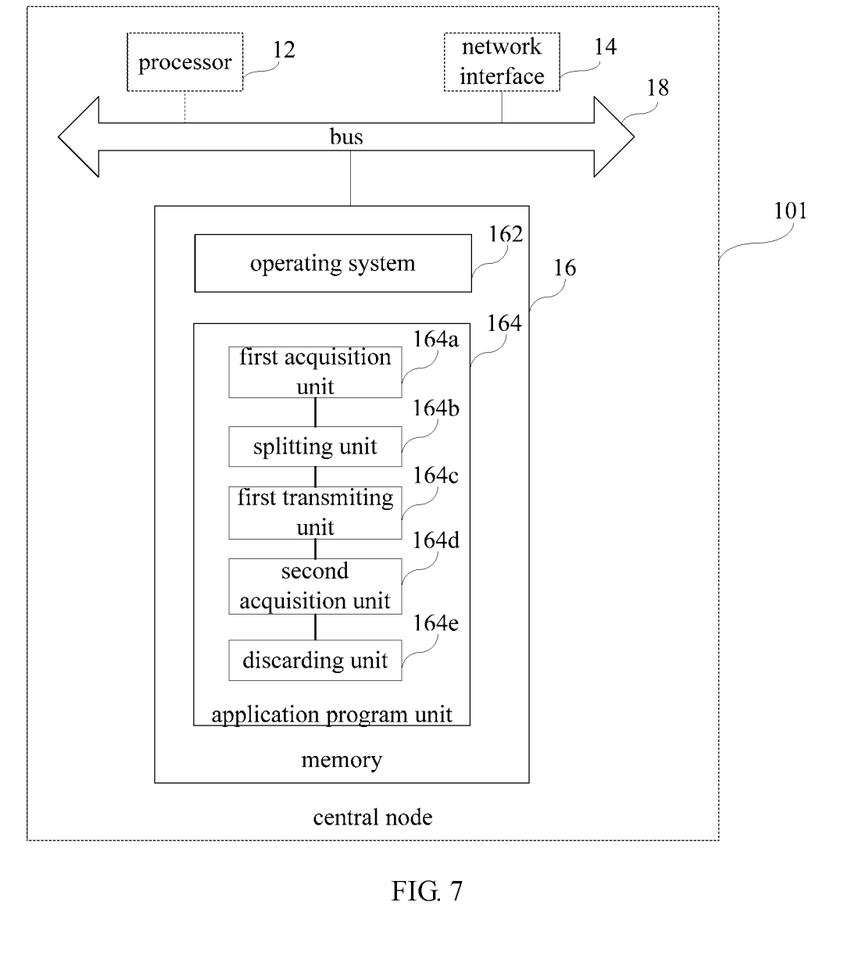
FIG. 7 is a schematic structural diagram of a central node according to an embodiment of the present application.

FIG. 7 is a schematic structural diagram of a central node according to the embodiment shown in FIG. 1. As shown in FIG. 7, the central node 101 includes a processor 12 and a network interface 14.

The processor 12 includes one or more processing cores. The processor 12 performs applications of various functions and data processing by running software programs and units.

There may be multiple network interfaces 14, through which the node can communicate with other storage devices or network devices.

The processor 12 performs the above image analysis method.

Optionally, the central node 101 further includes components such as a memory 16, a bus 18, and the like. Wherein, the memory 16 and the network interface 14 are connected to the processor 12 via the bus 18 respectively.

The memory 16 may be configured for storing software programs and units. Specifically, the memory 16 may store an operating system 162, and an application program unit 164 for at least one function. The operating system 162 may be an operating system such as Real Time eXecutive (RTX), LINUX, UNIX, WINDOWS, or OS X. The application program unit 164 may include a first acquisition unit 164*a*, a splitting unit 164*b*, a first transmitting unit 164*c*, a second acquisition unit 164*d*, and a discarding unit 164*e*.

The first acquisition unit 164*a* has the same or similar function as the first acquisition module 501.

The splitting unit 164*b* has the same or similar function as the splitting module 502.

The first transmitting unit 164*c* has the same or similar function as the first transmitting module 503.

The second acquisition unit 164*d* has the same or similar function as the second acquisition module 504.

The discarding unit 164*e* has the same or similar function as the discarding module 505.

The details of operations implemented by the modules in the above embodiment can be known with reference to in the method embodiments and is thus omitted here.

In the image analysis method provided by the embodiment of the present application, upon a program crash on a computing node, the central node may acquire the image analysis task that results in the crash, split the image analysis task into multiple image analysis sub-tasks, transmit sequentially the image analysis sub-tasks to the computing node until a program crash occurs thereon. The central node then acquires an error image analysis sub-task that results in the crash on the computing node, and discard the error image analysis sub-task. Compared with relevant art, the image analysis method according to the embodiment of the present application discards only the crash resulting image from an image analysis task, while other images in the image analysis task are retained. As such, fewer images are lost, so that the duration of a frame loss during video playback can be reduced and the reliability of image analysis can be improved.

An embodiment of the present application further provides an executable program which, when being executed, performs the above image analysis method, The method may include:

upon a program crash on a first computing node, acquiring a first image analysis task that results in the crash on the first computing node;

splitting the first image analysis task into multiple image analysis sub-tasks, each involving one image from the first image analysis task;

transmitting sequentially the multiple image analysis sub-tasks to a second computing node until a program crash occurs on the second computing node;

determining an error image analysis sub-task that results in the program crash on the second computing node; and discarding the error image analysis sub-task.

In the image analysis method provided by the embodiment of the present application, upon a program crash on a computing node, the central node may acquire the image analysis task that results in the crash, split the image analysis task into multiple image analysis sub-tasks, transmit sequentially the image analysis sub-tasks to the computing node until a program crash occurs thereon. The central node then acquires an error image analysis sub-task that results in the crash on the computing node, and discard the error image analysis sub-task. Compared with relevant art, the image analysis method according to the embodiment of the present application discards only the crash resulting image from an image analysis task, while other images in the image analysis task are retained. As such, fewer images are lost, so that the duration of a frame loss during video playback can be reduced and the reliability of image analysis can be improved An embodiment of the present application further provides a storage medium having executable program instructions stored thereon which, when being executed, perform the image analysis method described above. The method may include:

upon a program crash on a first computing node, acquiring a first image analysis task that results in the crash on the first computing node;

splitting the first image analysis task into multiple image analysis sub-tasks, each involving one image from the first image analysis task;

transmitting sequentially the multiple image analysis sub-tasks to a second computing node until a program crash occurs on the second computing node;

determining an error image analysis sub-task that results in the program crash on the second computing node; and discarding the error image analysis sub-task.

In the image analysis method provided by the embodiment of the present application, upon a program crash on a computing node, the central node may acquire the image analysis task that results in the crash, split the image analysis task into multiple image analysis sub-tasks, transmit sequentially the image analysis sub-tasks to the computing node until a program crash occurs thereon. The central node then acquires an error image analysis sub-task that results in the crash on the computing node, and discard the error image analysis sub-task. Compared with relevant art, the image analysis method according to the embodiment of the present application discards only the crash resulting image from an image analysis task, while other images in the image analysis task are retained. As such, fewer images are lost, so that the duration of a frame loss during video playback can be reduced and the reliability of image analysis can be improved.

It can be understood by those skills in the art that all or a part of steps in the above embodiments may be accomplished by hardware or by instructing related hardware through programs, which may be stored in a computer-readable storage medium, such as a read-only memory, a disk, an optical disk, or the like.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. An image analysis method, applicable to a central node and comprising:
   upon a program crash on a first computing node, acquiring a first image analysis task that results in the crash on the first computing node;
   splitting the first image analysis task into multiple image analysis sub-tasks, each involving one image from the first image analysis task;
   transmitting sequentially the multiple image analysis sub-tasks to a second computing node until a program crash occurs on the second computing node;
   determining an error image analysis sub-task that results in the program crash on the second computing node; and
   discarding the error image analysis sub-task.

2. The method of claim 1, wherein,
   after discarding the error image analysis sub-task, the method further comprises:
   combining unanalyzed image analysis sub-tasks from the first image analysis task into a second image analysis task;
   transmitting the second image analysis task to a third computing node;
   receiving, from the third computing node, a first analysis result for the second image analysis task executed by third computing node; and
   integrating the first analysis result and a second analysis result into a target analysis result; wherein, the second analysis result is obtained by the second computing node through analyzing the image analysis sub-tasks in the first image analysis task.

3. The method of claim 2, wherein,
   after splitting the first image analysis task into multiple image analysis sub-tasks, the method further comprises:
   assigning an image identity ID to each of the image analysis sub-tasks; wherein, each image ID comprises a source ID for identifying an image analysis task from which the image analysis sub-tasks are split, and each image analysis sub-task carries a respective image ID;
   integrating the first analysis result and a second analysis result into a target analysis result comprises:
   integrating all analysis results carrying the source ID into a target analysis result.

4. The method of claim 3, wherein, the central node is provided with a queue of accomplished image tasks to accommodate analysis results for image analysis tasks executed by computing nodes that are managed by the central node, each of the analysis results comprising an analysis result for at least one image,
   integrating all the analysis results carrying the source ID into a target analysis result comprises:
   integrating all the elements for analysis results carrying the source ID in the queue of accomplished image tasks into a single element that contains the target analysis result.

5. The method of claim 1, wherein, the central node is provided with a queue of to-be-filtered image tasks to accommodate image analysis sub-tasks split from an image analysis task that results in a program crash on a computing node, each of the image analysis sub-tasks involving one image;
   before transmitting sequentially the multiple image analysis sub-tasks to a second computing node, the method further comprises:
   placing sequentially the multiple image analysis sub-tasks into the queue of to-be-filtered image tasks;
   transmitting sequentially the multiple image analysis sub-tasks to a second computing node comprises:
   acquiring sequentially the multiple image analysis sub-tasks from the queue of to-be-filtered image tasks, and transmitting the multiple image analysis sub-tasks to the second computing node respectively.

6. The method of claim 2, wherein, the central node is provided with a queue of normal image tasks to accommodate image analysis tasks generated by the central node, each of the generated image analysis tasks involving at least one image;
   before transmitting the second image analysis task to a third computing node, the method further comprises:
   placing the second image analysis task into the queue of normal image tasks;

transmitting the second image analysis task to a third computing node comprises:
  acquiring the second image analysis task from the queue of normal image tasks, and transmitting the acquired second image analysis task to the third computing node.

7. The method of claim 3, wherein, each image ID further comprises an image serial number for indicating a rank of an image in the image analysis task indicated by the source ID.

8. The method of claim 3, wherein, the source ID is a timestamp indicating the time of generation of the image analysis task from which the image analysis sub-tasks are split.

9. A central node, comprising:
  a processor configured for performing operations of: upon a program crash on a first computing node, acquiring a first image analysis task that results in the crash on the first computing node;
  splitting the first image analysis task into multiple image analysis sub-tasks, each involving one image from the first image analysis task;
  transmitting sequentially the multiple image analysis sub-tasks to a second computing node until a program crash occurs on the second computing node;
  determining an error image analysis sub-task that results in the program crash on the second computing node; and
  discarding the error image analysis sub-task; and
  a network interface connected to the processor.

10. The central node of claim 9, wherein, the processor is further configured for performing operations of:
  combining unanalyzed image analysis sub-tasks from the first image analysis task into a second image analysis task;
  transmitting the second image analysis task to a third computing node;
  receiving, from the third computing node, a first analysis result for the second image analysis task executed by third computing node; and
  integrating the first analysis result and a second analysis result into a target analysis result; wherein, the second analysis result is obtained by the second computing node through analyzing the image analysis sub-tasks in the first image analysis task.

11. The central node of claim 10, wherein, the processor is further configured for performing an operation of:
  assigning an image identity ID to each of the image analysis sub-tasks; wherein, each image ID comprises a source ID for identifying an image analysis task from which the image analysis sub-tasks are split, and each image analysis sub-task carries a respective image ID;
  the operation of integrating the first analysis result and a second analysis result into a target analysis result comprises:
  integrating all analysis results carrying the source ID into a target analysis result.

12. The central node of claim 11, wherein, the central node is provided with a queue of accomplished image tasks to accommodate analysis results for image analysis tasks executed by computing nodes that are managed by the central node, each of the analysis results comprising an analysis result for at least one image,
  the operation of integrating all the analysis results carrying the source ID into a target analysis result comprises:
  integrating all the elements for analysis results carrying the source ID in the queue of accomplished image tasks into a single element that contains the target analysis result.

13. The central node of claim 9, wherein, the central node is provided with a queue of to-be-filtered image tasks to accommodate image analysis sub-tasks split from an image analysis task that results in a program crash on a computing node, each of the image analysis sub-tasks involving one image, the processor is further configured for perform an operation of:
  placing sequentially the multiple image analysis sub-tasks into the queue of to-be-filtered image tasks, before transmitting sequentially the multiple image analysis sub-tasks to a second computing node; and
  the operation of transmitting sequentially the multiple image analysis sub-tasks to a second computing node comprises:
  acquiring sequentially the multiple image analysis sub-tasks from the queue of to-be-filtered image tasks, and transmitting the multiple image analysis sub-tasks to the second computing node respectively.

14. The central node of claim 10, wherein, the central node is provided with a queue of normal image tasks to accommodate image analysis tasks generated by the central node, each of the generated image analysis tasks involving at least one image, the processor is further configured for perform an operation of:
  placing the second image analysis task into the queue of normal image tasks, before transmitting the second image analysis task to a third computing node; and
  the operation of transmitting the second image analysis task to a third computing node comprises:
  acquiring the second image analysis task from the queue of normal image tasks, and transmitting the acquired second image analysis task to the third computing node.

15. The central node of claim 11, wherein, each image ID further comprises an image serial number for indicating a rank of an image in the image analysis task indicated by the source ID.

16. The central node of claim 11, wherein, the source ID is a timestamp indicating the time of generation of the image analysis task from which the image analysis sub-tasks are split.

17. A central node, comprising: a processor, a network interface, a memory and a bus; wherein, the memory and the network interface are respectively connected to the processor via the bus; the memory stores an operating system and an application program unit which, when executed by the processor, causes the processor to perform the image analysis method of claim 1.

18. A non-transitory computer readable storage medium having executable program instructions stored thereon which, when being executed by a computer, causes the computer to perform the image analysis method of claim 1.

* * * * *